(12) United States Patent
Childs et al.

(10) Patent No.: US 9,813,662 B2
(45) Date of Patent: Nov. 7, 2017

(54) TRANSFER TO TARGET DISAMBIGUATION

(71) Applicant: Lenovo (Singapore) Pte. Ltd., Singpaore (SG)

(72) Inventors: Philip Lee Childs, Durham, NC (US); Michael Terrell Vanover, Raleigh, NC (US); Hui Wang, Beijing (CN); Shaowei Chen, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 521 days.

(21) Appl. No.: 13/690,006

(22) Filed: Nov. 30, 2012

(65) Prior Publication Data

US 2014/0152894 A1 Jun. 5, 2014

(51) Int. Cl.
*H04N 5/76* (2006.01)

(52) U.S. Cl.
CPC ..................................... *H04N 5/76* (2013.01)

(58) Field of Classification Search
None
See application file for complete search history.

(56) References Cited

U.S. PATENT DOCUMENTS

| | | | | |
|---|---|---|---|---|
| 7,257,575 B1* | 8/2007 | Johnston | ............. | G06F 17/2247 |
| 8,325,141 B2* | 12/2012 | Marsden | ............... | G06F 3/0231 345/168 |
| 8,504,008 B1* | 8/2013 | Gossweiler, III | . | H04M 1/72533 455/419 |
| 2003/0040922 A1* | 2/2003 | Bodin | .................. | G06Q 10/087 705/1.1 |
| 2008/0152263 A1* | 6/2008 | Harrison | ............... | G06F 1/1626 382/313 |
| 2009/0239587 A1* | 9/2009 | Negron | ............... | G06F 3/04883 455/566 |
| 2010/0081375 A1* | 4/2010 | Rosenblatt | ............. | G08C 17/02 455/41.1 |
| 2010/0327066 A1* | 12/2010 | Khan | .................. | G06K 17/0022 235/462.01 |
| 2011/0083111 A1* | 4/2011 | Forutanpour et al. | ........ | 715/863 |
| 2011/0093821 A1* | 4/2011 | Wigdor | ............... | G06F 3/04812 715/863 |
| 2011/0098029 A1* | 4/2011 | Rhoads | ............... | G01C 21/3629 455/418 |
| 2011/0258211 A1* | 10/2011 | Kalisky et al. | ................ | 707/758 |
| 2012/0036225 A1* | 2/2012 | Chor | ........................ | H04L 67/02 709/219 |
| 2012/0057081 A1* | 3/2012 | Petersson | ............. | G06F 3/04883 348/734 |
| 2012/0072271 A1* | 3/2012 | Dessert | .............. | G06Q 30/0207 705/14.1 |

(Continued)

*Primary Examiner* — Henry Tsai
*Assistant Examiner* — Christopher Bartels
(74) *Attorney, Agent, or Firm* — Ference & Associates LLC

(57) ABSTRACT

An aspect provides a method, including: ascertaining, at a first device, a request to transfer media data to another device; determining, at the first device, a plurality of connected devices for potential transfer of media data corresponding to the request; providing, at the first device, a disambiguation cue to a user; ascertaining via the disambiguation cue a target device from the plurality of connected devices for transfer of the media data; and transferring the media data to the target device. Other aspects are described and claimed.

16 Claims, 3 Drawing Sheets

(56) References Cited

U.S. PATENT DOCUMENTS

| | | | |
|---|---|---|---|
| 2012/0151346 A1* | 6/2012 | McClements, IV | 715/716 |
| 2012/0185785 A1* | 7/2012 | Avellan et al. | 715/760 |
| 2012/0227077 A1* | 9/2012 | Spivack et al. | 725/110 |
| 2012/0274775 A1* | 11/2012 | Reiffel | G06Q 30/08 348/158 |
| 2012/0282974 A1* | 11/2012 | Green et al. | 455/550.1 |
| 2013/0113993 A1* | 5/2013 | Dagit, III | 348/552 |
| 2013/0154957 A1* | 6/2013 | Locker et al. | 345/173 |
| 2014/0089096 A1* | 3/2014 | Van Anz | G06Q 30/0267 705/14.64 |
| 2014/0098038 A1* | 4/2014 | Paek | G06F 1/1692 345/173 |
| 2014/0258886 A1* | 9/2014 | Strong | 715/753 |
| 2014/0325371 A1* | 10/2014 | Wilson et al. | 715/739 |

* cited by examiner

TRANSFER TO TARGET DISAMBIGUATION

BACKGROUND

Information handling devices ("devices"), for example cell phones, smart phones, tablet devices, laptop and desktop computers, televisions or flat panel display devices with built in processing and logic circuitry, etc., may be used to access, view, edit or otherwise handle data. Increasingly, users combine devices in a use experience due to the growing ability of user devices to communicate with one another and to cooperate in data handling tasks.

Media data consumption is a common use context for using multiple devices. As an example, a user may wish to utilize a first device such as a smart phone or a tablet to look up and begin consuming media data, such as an Internet video, and then use another device to supplement or augment the media consumption, such as utilizing a television as a display device for viewing the video. The user may transfer or otherwise communicate the media (or identifier thereof) being consumed on the first device to the second device.

BRIEF SUMMARY

In summary, one aspect provides a method, comprising: ascertaining, at a first device, a request to transfer media data to another device; determining, at the first device, a plurality of connected devices for potential transfer of media data corresponding to the request; providing, at the first device, a disambiguation cue to a user; ascertaining via the disambiguation cue a target device from the plurality of connected devices for transfer of the media data; and transferring the media data to the target device.

Another aspect provides an information handling device, comprising: one or more processors; and a memory operatively coupled to the one or more processors that stores instructions executable by the one or more processors to perform acts comprising: ascertaining, at the information handling device, a request to transfer media data to another device; determining, at the information handling device, a plurality of connected devices for potential transfer of media data corresponding to the request; providing, at the information handling device, a disambiguation cue to a user; ascertaining via the disambiguation cue a target device from the plurality of connected devices for transfer of the media data; and transferring the media data to the target device.

A further aspect provides a program product, comprising: a storage medium having computer program code embodied therewith, the computer program code comprising: computer program code configured to ascertain, at a first device, a request to transfer media data to another device; computer program code configured to determine, at the first device, a plurality of connected devices for potential transfer of media data corresponding to the request; computer program code configured to provide, at the first device, a disambiguation cue to a user; computer program code configured to ascertain via the disambiguation cue a target device from the plurality of connected devices for transfer of the media data; and computer program code configured to transfer the media data to the target device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
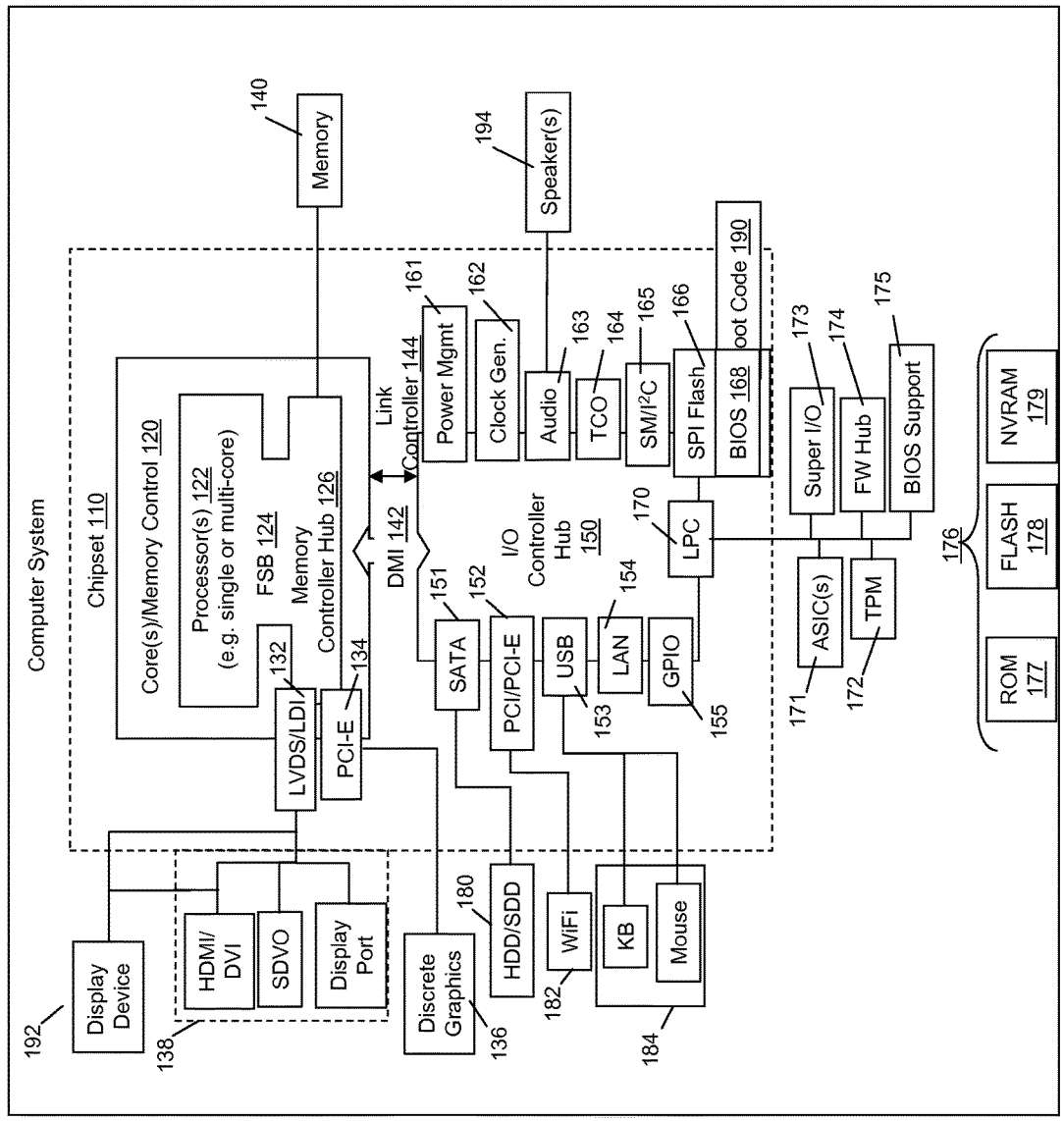
FIG. 1 illustrates an example information handling device and components thereof.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The description uses certain examples relating to media data consumption. It will be understood by those having ordinary skill in the art that these examples extend to data in general that is to be consumed (viewed, heard, interacted with, etc.) by a user. Thus, the phrase "media data" is defined herein to include various media types, including video data, audio data, text data, documents, and web based content.

In a data consumption context (with media data being used as an example) where media data is to be transferred between devices, a user may attempt to transfer media data from one device (e.g., a tablet or smart phone device) to another device (e.g., a television or laptop computer). A user may attempt to transfer the media data, such as a currently playing video or slide show, to the other device via a gesture (e.g., a "flick") to the other device, for example via a finger swipe or slide on the touch screen of a tablet device in the direction of a target device, e.g., a television. The flick to transfer gesture is interpreted by the user's device (e.g., tablet) as a transfer media data action that initiates a transfer protocol to the target device (e.g., television), for example via a wireless connection there-between.

Thus, responsive to the flick to transfer gesture action of the user, the tablet device may transfer media data to a connected device for display, for example streaming video data to the television for display over a network connection, for example a short range wireless connection (e.g., BLUETOOTH wireless connection) or an Internet connection. Other transfer protocols are possible, for example sending a media data identifier for initiation of media play at the target device using a local file, etc. Regardless of the specific transfer protocol, software on the each device (the transferor device and the transferee device) coordinate according to a transfer protocol and the media data may be consumed using the target device. Other devices may be involved in the transfer, for example Internet or other remote devices.

A problem may arise, however, when more than one potential target device exists. For example, in the example context above, it may happen that another potential target device, e.g., a laptop or desktop computing device, is co-located with the user's intended target device (in this example, a television). Thus, the flick to transfer action may not have enough refinement (e.g., in terms of directionality of the gesture towards the target device) to make a positive determination of the intended target from among the plurality of potential target devices connected to (or connectable to) the user's device (in this example, a tablet computer).

Accordingly, an embodiment provides mechanisms for target device disambiguation in such scenarios. In an embodiment, a visual indictor or other disambiguation cue is provided to the user. From this disambiguation cue, the user may be guided to selection of an appropriate target device. The disambiguation cue may include an ordered listing of potential devices along with a device indicator (such as an alpha or numeric indicator or other icon).

The ordered listing (which may be a list, a hierarchy or an otherwise formatted, organized device prioritization) of potential devices may be ordered according to a variety of prioritization methods, including but not limited to using a user transfer history, using proximity metrics of connected devices (e.g., wireless signal strength), using location and/or directionality metrics of devices (with or without coordination to a flick to transfer or other gesture input directionality), transferor and/or transferee device attributes, media data and/or application attributes, or a suitable combination of the foregoing. By providing the user with a disambiguation cue, an embodiment offers the user a chance to disambiguate the transfer request and facilitate media data transfer to a target device. If no user input is forthcoming, e.g., within a predetermined time, an embodiment may take a best guess approach, for example completing the transfer based on a default, for example selecting the first device in the ordered list, may terminate the transfer request, or may cycle through another disambiguation cue (either the same or different/reordered disambiguation cue).

The illustrated example embodiments will be best understood by reference to the figures. The following description is intended only by way of example, and simply illustrates certain example embodiments.

Figure 2:
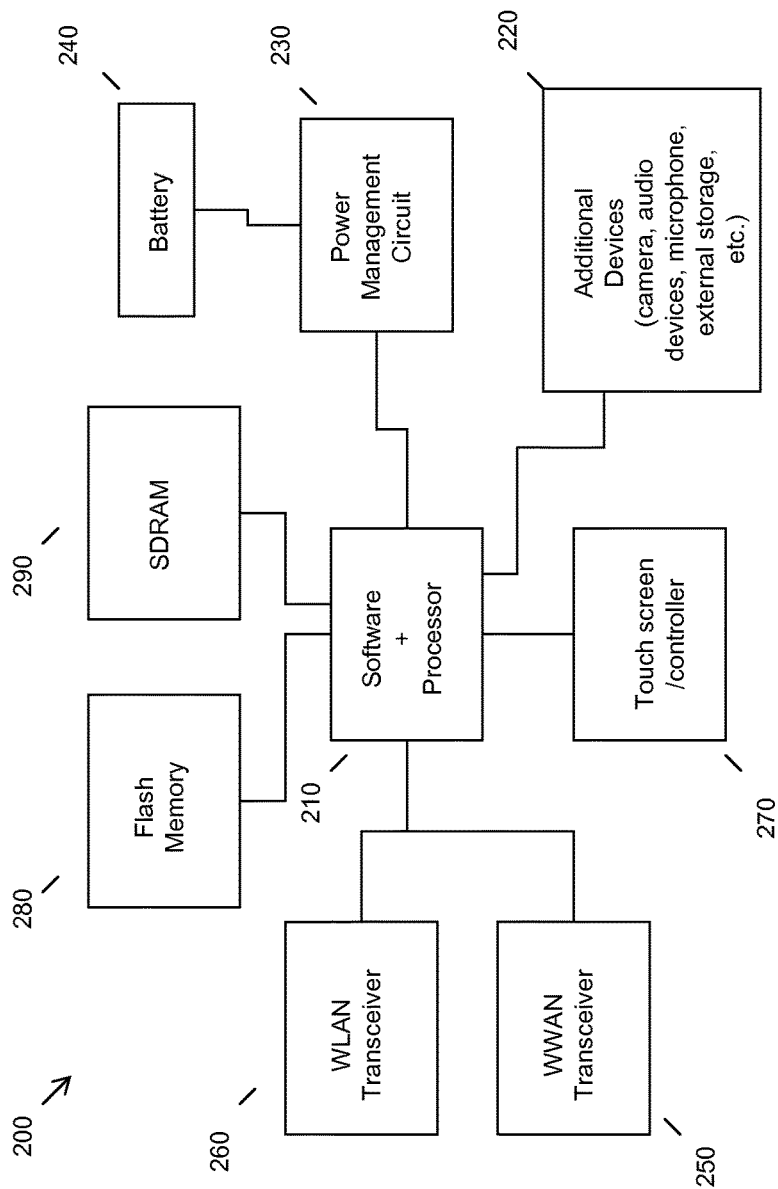
FIG. 2 illustrates another example information handling device and components thereof.

Referring to FIG. 1 and FIG. 2, while various other circuits, circuitry or components may be utilized, with regard to smart phone and/or tablet circuitry 200, an example illustrated in FIG. 2 includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1 and FIG. 2, may include user devices or connected devices. For example, FIG. 1 may be a potential target device, such as a laptop computing device or a smart television device or the like, that is connectable to a user device, for example as illustrated in FIG. 2. Thus, a user may use his or her device 200 to connect to a connected device to effect a media data transfer, for example by utilizing a flick to transfer gesture on the device 200 to initiate a transfer protocol to transfer media data to a device such as that outlined in FIG. 1.

Figure 3:
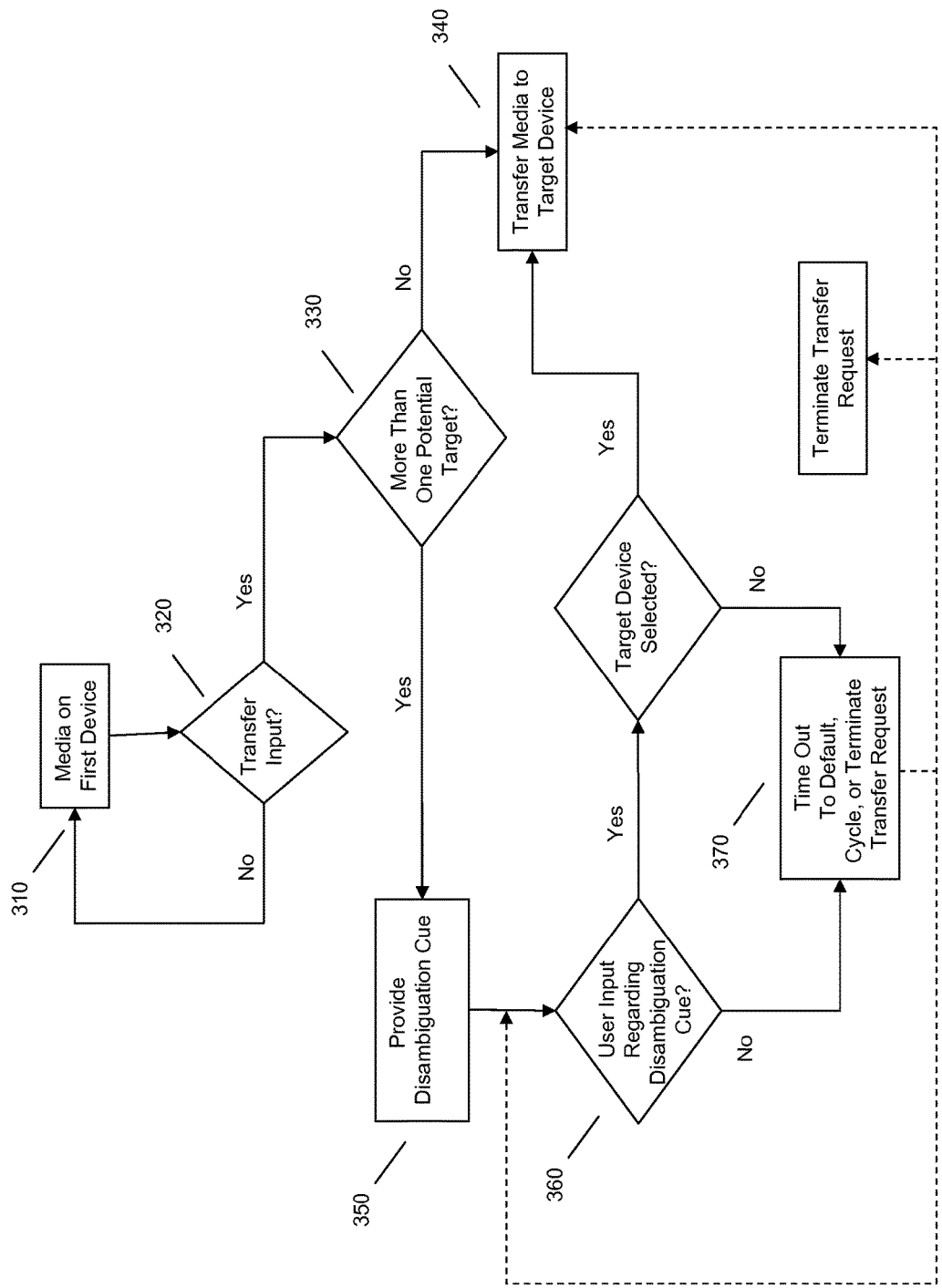
FIG. 3 illustrates an example method of disambiguating media data transfers between devices.

Referring to FIG. 3, an example method of disambiguating media data transfers between devices is illustrated. At 310, a user may initiate media data consumption on a first device, for example a tablet or smart phone. The initiation of media data consumption may include but is not limited to identifying media to be consumed, or may include actually viewing, interacting with, etc., media data on the first device. The user may then decide to initiate media data consumption on another device at 320. If so, the user may attempt to transfer media data to another, target device. The media data to be transferred may include actual media data (e.g., a media data file or portion thereof currently being consumed on the first device), or may include an identification of the media data to be consumed. The user indicates to the first device, e.g., via a flick to transfer gesture, that media data is to be transferred to a target device at 320.

If only one target device is available or the choice of target is otherwise not ambiguous, as determined at 330, a transfer to a target device at 340 may be initiated without further delay. In the event that more than one potential target device is available (i.e., the choice of target device is ambiguous), e.g., due to co-location of the potential target devices at 330, an embodiment may provide a disambiguation cue to the user at 350. For example, an embodiment may provide an ordered listing of connected devices that are potential targets. The ordered listing may include but is not limited to the following: all connected devices, may additionally include devices within range but not yet connected, may include a sub-set of connected devices (e.g., commonly used devices) or a suitable combination of the foregoing.

The ordered listing may be ordered in a variety of ways to provide the most helpful disambiguation cue to the user. For example, a user history may be accessible to the first device that may be used to order the devices in the disambiguation cue provided at 350. For example, a user history may indicate that 90 percent of media data transfers are to a particular connected device, e.g., a television, such that this particular device is prioritized in the ordered listing. Other approaches to ordering the listing may be used. For example, media data attributes may be used, such as a type of media data file. Thus, an embodiment may prioritize a display device as a target device in the case of a video or picture file type by default, whereas a computing device such as a laptop computer may be prioritized in the list by default for other file types, e.g., word processing documents.

An embodiment may use a variety of factors to order the list. For example, an embodiment may utilize media data applications (i.e., for handling the particular media data), device attributes (such as the transferor and/or transferee devices capability for handling particular media data), or some suitable combination of the foregoing.

An embodiment may also use, alone or in combination with other factors, directionality or location information in ordering the ordered list. For example, a transferor device may use internal components (e.g., a compass, GPS or other location capabilities) to ascertain location information of the transferor device and/or the transferee device(s). For example, a location factor that may be used to order the ordered list could include a location of the transferor device, e.g., "at home", to prioritize transferee device(s) known to be located in the user's home. More refined directionality/location information may be utilized by an embodiment as well, for example ascertaining the location, direction or orientation of the transferor device with respect to transferee device(s). For example, a determination that the transferor device is oriented to the northwest and a coordinated determination of transferee device(s) located to the northwest of the transferor device may be used to prioritize those devices. The location and directionality information may be used in combination, for example prioritizing devices located "at home" and in the path of the transferor device direction (e.g., northwest corner of a room). Directionality of the gesture input may additionally be utilized. Moreover, a proximity factor (e.g., wireless signal strength) may additionally be utilized, again either alone or in combination with other factors, to provide ordering of the ordered list.

An embodiment may thus use a combination of factors (e.g., location, directionality, proximity, user history, application and/or device attributes) to formulate the disambiguation cue (e.g., prioritize the ordered list). Once the disambiguation cue is provided to the user at 350, e.g., as displayed on the first device's display screen, an embodiment may wait for user input regarding the disambiguation cue at 360. For example, an embodiment may ascertain a selection of a target device from the ordered list at 360, e.g., via user selection using a touch screen display. Alternatively, the user may provide input dismissing the disambiguation cue, e.g., providing user input without a particular selection, such as hiding or minimizing the disambiguation cue. In either case, an embodiment may select a target device from among the potential target devices as a default target device.

In the case of a direct selection by the user, an embodiment may initiate media data transfer to the selected target device 340. In the case of an input without selection, an embodiment may either select a target device (e.g., a default target device, for example the first device in the ordered list or another default device, which may be user configurable), may cycle to provide another disambiguation cue (e.g., re-order the ordered list or provide a different listing of devices, or a suitable combination of the foregoing), or may terminate the transfer process. Similarly, in the event that no user input is forthcoming responsive to the disambiguation cue, an embodiment may either terminate the transfer, cycle the same or another disambiguation cue, or may select a default target device (e.g., after a predetermined time) for completing the transfer at 340.

Thus, an embodiment may provide a disambiguation cue to facilitate appropriate selection of a target device in the event of an ambiguous target device scenario. Embodiment provide the disambiguation cue on the basis of one or more factors in order to intelligently resolve an ambiguous transfer action, thus promoting intended media data transfers between connected devices and avoiding user frustration that may result in failed or inaccurate media data transfers.

While the various example embodiments have been described in connection with facilitating particular media data transfers between devices, these were provided as non-limiting examples. Accordingly, embodiments may be used to provide similar functionality and services in other contexts and for many data types. Accordingly, "media data" again is used herein so as to be construed broadly to include not only visual media data, but other data, including music and/or audio data, word processing data, web based content, and the like. Similarly, although devices such as tablets, smart phones, laptops and television devices have been used in the description as specific examples, embodiments may be utilized in connection with other types of devices, for example, e-readers, desktop computers, kiosks, and the like.

It will also be understood that the various embodiments may be implemented in one or more information handling devices configured appropriately to execute program instructions consistent with the functionality of the embodiments as described herein. In this regard, FIG. 1 and FIG. 2 illustrate non-limiting examples of such devices and components thereof.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    identifying, at a first device, media data to be played;
    thereafter ascertaining, at the first device, a request to transfer the media data to another device, the request comprising a flick to transfer gesture provided to a touch screen of the first device;
    determining, at the first device, a plurality of connected display devices for potential transfer of media data corresponding to the request in response to the flick to transfer gesture, wherein the flick to transfer gesture identifies more than one of the plurality of connected display devices as a target for transfer;
    generating, at the first device, a disambiguation cue for a user, the disambiguation cue comprising a visual display of indicators of the plurality of connected display devices;
    wherein the visual display of indicators comprises a list;
    ascertaining via the disambiguation cue a target display device from the plurality of connected display devices for transfer of the media data; and
    transferring the media data to the target display device.

2. The method of claim 1, wherein the plurality of connected display devices are wirelessly connected to the first device using a short range wireless connection.

3. The method of claim 1, wherein the list comprises an ordered list of the plurality of connected display devices.

4. The method of claim 3, wherein the ordered list is ordered based on user transfer history.

5. The method of claim 3, wherein the ordered list is ordered based on a predetermined default ordering.

6. The method of claim 3, wherein the ordered list is ordered based on directional information ascertained by the first device using a directionality metric of the flick to transfer gesture.

7. The method of claim 3, wherein the ordered list is ordered based on one or more of: media data attributes, media data application attributes, and connected display device attributes.

8. The method of claim 1, wherein the first device comprises a tablet device and further wherein one of the plurality of connected display devices comprises a television.

9. An information handling device, comprising:
a touch screen;
one or more processors; and
a memory operatively coupled to the one or more processors that stores instructions executable by the one or more processors to:
identify, at the information handling device, media data to be played;
ascertain, at the information handling device, a request to transfer media data to another display device, the request comprising a flick to transfer gesture provided to the touch screen;
determining, at the information handling device, a plurality of connected display devices for potential transfer of media data corresponding to the request in response to the flick to transfer gesture, wherein the flick to transfer gesture identifies more than one of the plurality of connected display devices as a target for transfer;
generating, at the information handling device, a disambiguation cue for a user, the disambiguation cue comprising a visual display of indicators of the plurality of connected display devices;
wherein the visual display of indicators comprises a list;
ascertaining via the disambiguation cue a target display device from the plurality of connected display devices for transfer of the media data; and
transferring the media data to the target display device.

10. The information handling device of claim 9, wherein the plurality of connected display devices are wirelessly connected to the information handling device using a short range wireless connection.

11. The information handling device of claim 9, wherein the list comprises an ordered list of the plurality of connected display devices.

12. The information handling device of claim 11, wherein the ordered list is ordered based on user transfer history.

13. The information handling device of claim 11, wherein the ordered list is ordered based on a predetermined default ordering.

14. The information handling device of claim 11, wherein the ordered list is ordered based on directional information ascertained by the information handling device using a directionality metric of the flick to transfer gesture.

15. The information handling device of claim 11, wherein the ordered list is ordered based on one or more of: media data attributes, media data application attributes, and connected display device attributes.

16. A program product, comprising:
a storage medium having computer program code embodied therewith, the computer program code being executable by a processor and comprising:
computer program code that identifies, at a first device, media data to be played;
computer program code that ascertains, at the first device, a request to transfer media data to another device, the request comprising a flick to transfer gesture provided to a touch screen of the first device;
computer program code that determines, at the first device, a plurality of connected display devices for potential transfer of media data corresponding to the request in response to the flick to transfer gesture, wherein the flick to transfer gesture identifies more than one of the plurality of connected display devices as a target for transfer;
computer program code that generates, at the first device, a disambiguation cue for a user, the disambiguation cue comprising a visual display of indicators of the plurality of connected display devices;
wherein the visual display of indicators comprises a list;
computer program code that ascertains via the disambiguation cue a target display device from the plurality of connected display devices for transfer of the media data; and
computer program code that transfers the media data to the target display device.

* * * * *